United States Patent
Defrancisci et al.

(10) Patent No.: US 11,111,357 B2
(45) Date of Patent: Sep. 7, 2021

(54) USE OF MIXTURES OF MONOPEROXYCARBONATE PEROXIDES FOR THE CROSS-LINKING AND COMPOSITION OF CROSS-LINKABLE POLYMERS

(71) Applicant: ARKEMA FRANCE, Colombes (FR)

(72) Inventors: Alfredo Defrancisci, Lyons (FR); Chao Lu, Jiangsu (CN)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/327,538

(22) PCT Filed: Jul. 22, 2015

(86) PCT No.: PCT/FR2015/052016
§ 371 (c)(1),
(2) Date: Jan. 19, 2017

(87) PCT Pub. No.: WO2016/012718
PCT Pub. Date: Jan. 28, 2016

(65) Prior Publication Data
US 2017/0166726 A1  Jun. 15, 2017

(30) Foreign Application Priority Data
Jul. 25, 2014 (FR) ...................... 1457184

(51) Int. Cl.
*C08K 5/14* (2006.01)
*C08J 3/24* (2006.01)
*C08J 5/18* (2006.01)

(52) U.S. Cl.
CPC .............. *C08K 5/14* (2013.01); *C08J 3/24* (2013.01); *C08J 5/18* (2013.01); *C08J 2323/08* (2013.01); *C08K 2201/014* (2013.01)

(58) Field of Classification Search
CPC ...... C08L 23/06; C08L 23/0853; C08L 23/08; C08K 5/14
See application file for complete search history.

(56) References Cited

U.S. PATENT DOCUMENTS

| 3,344,126 A | * 9/1967 | Witman ................. C08G 18/86 525/332.5 |
| 8,609,781 B2 | 12/2013 | Keromnes |
| 2012/0145241 A1 | 6/2012 | Fujiki |
| 2012/0301991 A1 | 11/2012 | Devisme et al. |

FOREIGN PATENT DOCUMENTS

| CN | 102099410 | 6/2011 |
| CN | 102666615 A | 9/2012 |
| CN | 102732160 | * 10/2012 |
| JP | S-5527328 | 2/1980 |
| JP | 2012-069866 A | 4/2012 |
| JP | 2013-221145 A | 10/2013 |
| WO | WO 2011/020760 A1 | 2/2011 |
| WO | WO 2011/067505 A1 | 6/2011 |

OTHER PUBLICATIONS

Translation of CN 102732160 (2012) (Year: 2012).*
Partial translation of CN 102732160 (Year: 2012).*
International Search Report (PCT/ISA/210) dated Sep. 24, 2015, by the European Patent Office as the International Searching Authority for International Application No. PCT/FR2015/052016.
Written Opinion (PCT/ISA/237) dated Sep. 24, 2015, by the European Patent Office as the International Searching Authority for International Application No. PCT/FR2015/052016.
Office Action (The First Office Action) dated Oct. 31, 2018, by the State Intellectual Property Office of the People's Republic of China in corresponding Chinese Patent Application No. 201580040329.3, and an English Translation of the Office Action. (12 pages).

* cited by examiner

*Primary Examiner* — Robert C Boyle
(74) *Attorney, Agent, or Firm* — Buchanan Ingersoll & Rooney P.C.

(57) ABSTRACT

The use of peroxide(s) for cross-linking at least one polymer, the polymer having a homopolymer or copolymer of ethylene and especially the ethylene-vinyl acetate copolymer (EVA) or a mixture of the EVA with another homopolymer or copolymer of ethylene, and at least one peroxide, wherein the peroxide includes OO-tert-butyl O-isopropyl monoperoxycarbonate or OO-tert-amyl O-isopropyl monoperoxycarbonate and OO-tert-butyl-O-2-ethyl hexyl monoperoxycarbonate or OO-tert-amyl-O-2ethyl hexyl monoperoxycarbonate. Also, a cross-linkable composition including the peroxide and to a method for producing a cross-linked polymer as a result of the peroxide.

18 Claims, 3 Drawing Sheets

XL density of the EVA film as a function of the dose of peroxide at 145°C

USE OF MIXTURES OF MONOPEROXYCARBONATE PEROXIDES FOR THE CROSS-LINKING AND COMPOSITION OF CROSS-LINKABLE POLYMERS

FIELD OF THE INVENTION

The present invention relates to the use of a specific peroxide, and also to a mixture of peroxides including this specific peroxide, for the crosslinking of an ethylene homopolymer or copolymer and in particular the ethylene-vinyl acetate (EVA) copolymer or a mixture of EVA with another ethylene homopolymer or copolymer. The present invention also relates to a crosslinkable composition comprising an ethylene homopolymer or copolymer and in particular the ethylene-vinyl acetate (EVA) copolymer and this specific peroxide or the abovementioned mixture of peroxides. The present invention also relates to a process for crosslinking ethylene homopolymer or copolymer and in particular the ethylene-vinyl acetate (EVA) copolymer.

PRIOR ART

It is known practice to crosslink ethylene homopolymers or copolymers and in particular the ethylene-vinyl acetate (EVA) copolymer using the latter in the presence of free-radical-initiating peroxides such as O,O-tert-butyl O-(2-ethylhexyl) monoperoxycarbonate. This peroxide O,O-tert-butyl O-(2-ethylhexyl) monoperoxycarbonate is manufactured and sold by the Applicant under the name Luperox® TBEC.

In certain applications, especially in the production of films encapsulating electrical components of photovoltaic modules (solar panels), it is absolutely essential for the crosslinked film to offer maximum electrical resistivity in order to totally insulate the electrical circuits from the environment.

In one such application (photovoltaic module encapsulators), EVA is very commonly used and represents a major proportion of the market at the present time. The EVA is necessarily crosslinked so that it in particular acquires the satisfactory thermomechanical properties for this application. Specifically, it is important, in a process for the crosslinking of an ethylene-vinyl acetate (EVA) copolymer, to conserve good crosslinking density. The reason for this is that the crosslinking density is an indication of the mechanical properties of the finished product. Thus, if the crosslinking density is too low, the finished product may be characterized by mediocre or even insufficient breaking strength or tear strength.

Now, the crosslinking of EVA with O,O-tert-butyl O-(2-ethylhexyl) monoperoxycarbonate, conventionally performed at the present time, has the consequence that the crosslinked polymer has unsatisfactory electrical insulation properties.

Moreover, the crosslinking times, especially for EVA, obtained via such processes using O,O-tert-butyl O-(2-ethylhexyl) monoperoxycarbonate, are relatively long. This results in a loss of production efficiency for industries transforming these elastomers into finished products.

Finally, the amount of peroxide required for this crosslinking is an important factor, not only with regard to the cost of the peroxide per se, but also due to the degradation products necessarily resulting from such a crosslinking process.

Taking into consideration in particular all the abovementioned characteristics and the drawbacks or weaknesses intrinsic to O,O-tert-butyl O-(2-ethylhexyl) monoperoxycarbonate as a crosslinking agent for crosslinkable compositions of elastomeric polymers such as ethylene-vinyl acetate (EVA) copolymers, there is a real need to find a replacement crosslinking agent, alone or as a mixture.

U.S. Pat. No. 3,344,126, JP 20 1206 9866, WO 2011/020 760 and WO 2011/067 505 are also known, which all disclose the use of a particular peroxide, O,O-tert-butyl O-isopropyl monoperoxycarbonate (TBIC), for the crosslinking of ethylene polymer or copolymer.

Admittedly, its efficiency is advantageous, but it has been discovered by the Applicant that by choosing to combine it with another peroxide of a particular type, in a quite specific ratio, entirely noteworthy synergism takes place.

BRIEF DESCRIPTION OF THE INVENTION

The Applicant has now discovered, surprisingly, that by using a peroxide of the same family as O,O-tert-butyl O-(2-ethylhexyl) monoperoxycarbonate in combination with a specific organic peroxide selected from TBEC (O,O-tert-butyl O-2-ethylhexyl monoperoxycarbonate) or TAEC (O,O-tert-amyl O-2-ethylhexyl monoperoxycarbonate), the drawbacks of the latter are overcome and that, in addition, very significant improvements are achieved regarding certain additional characteristics.

This result is all the more surprising since the crosslinking agent has only one branch R, unlike the peroxide O,O-tert-butyl O-(2-ethylhexyl) monoperoxycarbonate conventionally used, i.e. the branch R presented below:

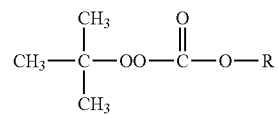

TBEC: R = 2-ethylhexyl
TBIC: R = isopropyl

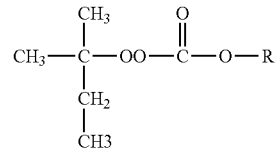

TAEC: R = 2-ethylhexyl
TA-IPC: R = isopropyl

The peroxide discovered by the Applicant for the particular application of the crosslinking of polymers including EVA is O,O-tert-butyl O-isopropyl monoperoxycarbonate, and as such the abovementioned group R is the following:

= isopropyl

In the case of O,O-tert-butyl O-(2-ethylhexyl) monoperoxycarbonate, the radical R is as follows:

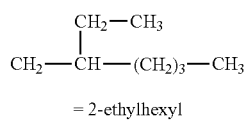

= 2-ethylhexyl

It was not at all obvious to a person skilled in the art to envisage that two peroxides that are so structurally similar could have, in the crosslinking of functional polymers and in particular EVA, such different properties/qualities, in favour of O,O-tert-butyl O-isopropyl monoperoxycarbonate or O,O-tert-amyl O-isopropyl monoperoxycarbonate.

Thus, the present invention relates to peroxide(s) for the crosslinking of at least one polymer, the said polymer consisting of an ethylene homopolymer or copolymer and in particular the ethylene-vinyl acetate (EVA) copolymer or a mixture of EVA with another ethylene homopolymer or copolymer, characterized in that the peroxide comprises O,O-tert-butyl O-isopropyl monoperoxycarbonate (TBIC) or O,O-tert-amyl O-isopropyl monoperoxycarbonate (TA-IPC) as well as O,O-tert-butyl-O-2-ethylhexyl monoperoxycarbonate (TBEC) or O,O-tert-amyl-O-2-ethylhexyl monoperoxycarbonate (TAEC).

Hereinbelow, the invention is presented in relation with TBIC since this component is commercially available. However, the experiments were also conducted with TA-IPC and the Applicant found, for the latter, laboratory results and properties that are at least as satisfactory as for those with TBIC.

According to a possibility offered by the invention, the only peroxides used for the crosslinking are the two abovementioned peroxides and combinations thereof. Thus, in this case, the peroxide consists of a mixture of O,O-tert-butyl O-isopropyl monoperoxycarbonate and of O,O-tert-butyl O-2-ethylhexyl monoperoxycarbonate or of O,O-tert-amyl O-2-ethylhexyl monoperoxycarbonate ("TBIC+TBEC" or "TBIC+TAEC" mixture), or O,O-tert-amyl O-isopropyl monoperoxycarbonate and O,O-tert-butyl O-2-ethylhexyl monoperoxycarbonate or O,O-tert-amyl O-2-ethylhexyl monoperoxycarbonate ("TA-IPC+TBEC" or "TA-IPC+TAEC" mixture), preferably in a mass ratio of 99%/1% to 1%/99% of these two peroxides forming the said mixture, more preferentially from 40%/60% to 60%/40% of these two peroxides forming the said mixture, and even more preferentially in a mass ratio of from 45%/55% to 55%/45% of these two peroxides forming the said mixture.

Advantageously, O,O-tert-butyl O-isopropyl monoperoxycarbonate or O,O-tert-amyl O-isopropyl monoperoxycarbonate is in dilute form, preferably present in an amount of greater than 50% in the dilution, and even more preferably present in an amount of greater than 60% in the dilution.

Hereinbelow, for the sake of simplicity, O,O-tert-butyl O-(2-ethylhexyl) monoperoxycarbonate will often be referred to by the abbreviation TBEC, whereas O,O-tert-butyl O-isopropyl monoperoxycarbonate will be referred to by the abbreviation TBIC. It is noted that this simplification of writing also applies to TA-IPC and TAEC.

Another aspect of the present invention relates to a crosslinkable composition comprising at least one ethylene-vinyl acetate (EVA) copolymer and at least one peroxide, characterized in that the peroxide comprises O,O-tert-butyl O-isopropyl monoperoxycarbonate as well as O,O-tert-butyl O-2-ethylhexyl monoperoxycarbonate or O,O-tert-amyl O-2-ethylhexyl monoperoxycarbonate.

Other advantageous characteristics of the invention are specified hereinbelow:

according to a possibility offered by the invention, the peroxide consists of a mixture of O,O-tert-butyl O-isopropyl monoperoxycarbonate and of O,O-tert-amyl O-2-ethylhexyl monoperoxycarbonate (TBIC+TBEC) or O,O-tert-amyl O-2-ethylhexyl monoperoxycarbonate (TBIC+TAEC), or O,O-tert-amyl O-isopropyl monoperoxycarbonate and O,O-tert-butyl O-2-ethylhexyl monoperoxycarbonate or O,O-tert-amyl O-2-ethylhexyl monoperoxycarbonate ("TA-IPC+TBEC" or "TA-IPC+TAEC" mixture), preferably in a ratio of 40% to 60% of these two peroxides forming the said mixture, more preferentially in a ratio of 45% to 55% of these two peroxides forming the said mixture;

the mixture of peroxides represents between 0.2% and 4% and preferably between 0.5% and 2.5% of the amount by mass of the polymer present in the said composition;

preferably the abovementioned ethylene-vinyl acetate (EVA) copolymer is present in the said composition in a content ranging from 70% to 99.9% and preferably from 97% to 99% by weight relative to the weight of the composition;

according to a possibility offered by the invention, as a function of the applications selected for the crosslinked polymer, the composition also comprises one or more crosslinking coagents, or promoters. As crosslinking promoter of multi-substituted aromatic type, mention may be made of divinylbenzene, diisopropenylbenzene, α-methylstyrene, α-methylstyrene dimer and triallyl trimellitate. As crosslinking promoter based on multi-substituted methacrylate, mention may be made of ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate and trimethylolpropane trimethacrylate. The crosslinking promoter based on multi-substituted methacrylate is advantageously used, in particular ethylene glycol dimethacrylate and trimethylolpropane trimethacrylate. As crosslinking promoter based on multi-substituted acrylate, mention may be made of bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, trimethylolpropane triacrylate and dipentaerythritol pentaacrylate. As nitrogenous crosslinking promoter, mention may be made of triallyl cyanurate (TAC), triallyl isocyanurate (TAIC) and N,N'-m-phenylenedimaleimide. Mention may also be made of monomers multi-substituted with vinyl groups, butadiene, chloroprene and isoprene. The crosslinking coagents may be used in a content ranging from 0.05% to 30% by weight and preferentially from 0.1% to 10% by weight relative to the weight of the composition.

Other functional adjuvants may be used in the composition, such as one or more plasticizers, adhesion promoters, UV stabilizers and/or UV absorbers, antioxidants, flame retardants, colorants/optical brighteners, pigments and reinforcing fillers;

in the latter case, the functional agent is present in the said composition in a content ranging from 0.05% to 30% by weight and preferentially from 0.1% to 10% by weight relative to the weight of the composition.

It will be noted hereinbelow that the invention is presented, when there is a mixture of peroxides, with the additional peroxide consisting of O,O-tert-butyl O-2-ethylhexyl monoperoxycarbonate (TBEC), but it is clearly understood that the Applicant has also tested O,O-tert-amyl O-2-ethylhexyl monoperoxycarbonate (TAEC) and that the latter functions at least just as satisfactorily as TBEC when used as a mixture with TBIC or TA-IPC.

The present invention also relates to a process for manufacturing a crosslinked polymer film, characterized in that it comprises at least the following steps:
  a°) extrusion in the form of a film of a crosslinkable composition as defined above,
  b°) crosslinking of the said crosslinkable composition after the said extrusion step a°) for a time of not more than twenty minutes, preferably less than fifteen minutes.

DESCRIPTION OF THE ATTACHED FIGURES

The description that follows is given purely as a non-limiting illustration with reference to the attached figures, in which.

DETAILED DESCRIPTION OF THE INVENTION

Figure 1:
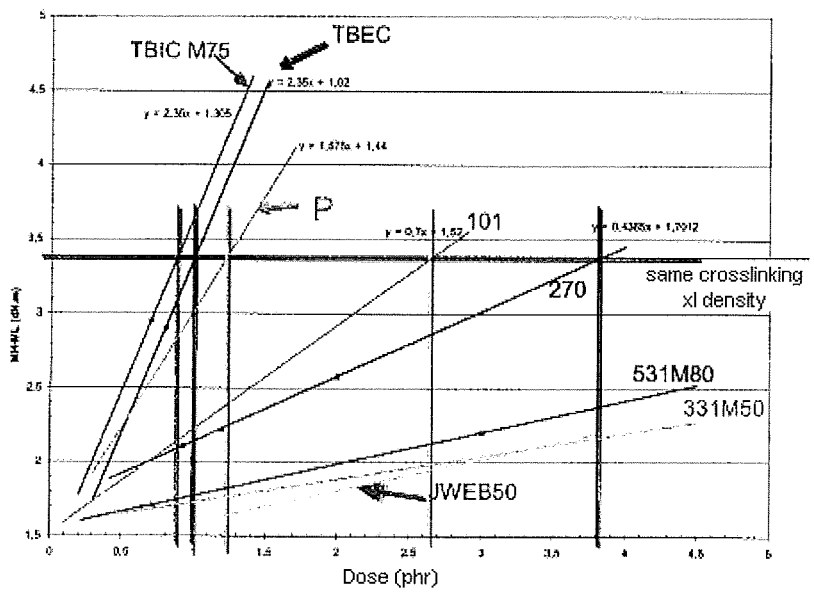
FIG. 1 shows the crosslinking density (XL) of an EVA film as a function of the dose for various peroxides.

As regards both the peroxides and the preferred polymer intended to be crosslinked, namely EVA, all these products are well known to those skilled in the art, both as regards their manufacture and as regards their commercial availability.

The following additional information regarding these products may simply be noted.

Ethylene-vinyl acetate (EVA) copolymers that are suitable for use in the present invention are, for example, the ethylene-vinyl acetate copolymers sold, respectively, under the trade names Evatane® 24-03, 24-03 SA, 28-03, 28-05, 28-25, 28-40, 28-150, 28-420, 28-800, 33-15, 33-25, 33-45, 33-45 PV, 33-400, 34-50 PV, by the company Arkema. The vinyl acetate content of the ethylene-vinyl acetate copolymers that are suitable for use in the present invention may vary: for example, these copolymers may have a low content of vinyl acetate or a high content of vinyl acetate.

O,O-tert-Butyl O-isopropyl monoperoxycarbonate is commercially sold especially by the Applicant, under the name Luperox® TBIC. At the present time, this peroxide is found in liquid form at concentrations ranging up to 77%, the solvent being a hydrocarbon, for instance isododecane. The Applicant sells, for example, this peroxide under the name Luperox® TBIC M75, i.e. at 75% in isododecane. The fact that this peroxide is not manufactured or sold in pure or virtually pure form is solely due to safety requirements (linked to its intrinsic thermo-sensitivity) which are liable to change over time. Hereinbelow, the examples tested are performed with Luperox® TBIC M75, but it is clearly understood that larger amounts of O,O-tert-butyl O-isopropyl monoperoxycarbonate (above 75%) were tested in the laboratory and that the results presented with this product were validated with different contents (in particular higher contents of TBIC which are not repeated here in the attached figures).

O,O-tert-Butyl O-(2-ethylhexyl) monoperoxycarbonate is sold commercially especially by the Applicant under the name Luperox® TBEC. At the present time, this peroxide is conventionally found in pure (or virtually pure) form or even in diluted form.

The preparation of the crosslinked polymer according to the invention is entirely conventional and well known to those skilled in the art. The only point to be noted lies in the fact that the heating time required for the crosslinking is reduced herein, and that a smaller amount of peroxide is necessary to achieve the set objectives, in particular as regards the criterion of resistivity by volume.

In particular (but not exclusively) in the application of the crosslinked polymer according to the invention to an encapsulator of a photovoltaic module, the film may comprise one or more functional adjuvants in the composition to a maximum proportion of 30% by weight of the composition and will be chosen more particularly from the compounds mentioned below or a mixture of these compounds.

One or more crosslinking coagents, or promoters, may be added to the composition according to the invention in order to improve the crosslinking density and kinetics. As crosslinking promoter of multi-substituted aromatic type, mention may be made of divinylbenzene, diisopropenylbenzene, α-methylstyrene, α-methylstyrene dimer and triallyl trimellitate. As crosslinking promoter based on multi-substituted methacrylate, mention may be made of ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate and trimethylolpropane trimethacrylate. The crosslinking promoter based on multi-substituted methacrylate is advantageously used, in particular ethylene glycol dimethacrylate and trimethylolpropane trimethacrylate. As crosslinking promoter based on multi-substituted acrylate, mention may be made of bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, neopentyl glycol ethoxylate diacrylate, butanediol diacrylate, hexanediol diacrylate, aliphatic urethane diacrylate, trimethylolpropane triacrylate, trimethylolpropane ethoxylate triacrylate, trimethylolpropane propoxylate triacrylate, glycerol propoxylate triacrylate, aliphatic urethane triacrylate, trimethylolpropane triacrylate and dipentaerythritol pentaacrylate. As nitrogenous crosslinking promoter, mention may be made of triallyl cyanurate (TAC), triallyl isocyanurate (TAIC) and N,N'-m-phenylenedimaleimide. Mention may also be made of monomers multi-substituted with vinyl groups, butadiene, chloroprene and isoprene.

Plasticizers may also be added to the composition according to the invention in order to facilitate the implementation and to improve the production efficiency of the process for manufacturing the composition and the structures. Examples that will be mentioned include paraffinic, aromatic or naphthenic mineral oils which also make it possible to improve the adhesion power of the composition according to the invention. Plasticizers that may also be mentioned include phthalates, azelates, adipates and tricresyl phosphate.

Similarly, although not necessary, adhesion promoters may advantageously be added in order to improve the adhesion power of the composition when this power must be particularly high. The adhesion promoter is a non-polymeric ingredient; it may be organic, crystalline, mineral and more preferentially semi-mineral semi-organic. Among the latter, mention may be made of organic silanes or titanates, for instance monoalkyl titanates, trichlorosilanes and trialkoxysilanes. It may also be envisaged for these adhesion promoters to be directly grafted onto the first or the second copolymer via a technique that is well known to those skilled in the art, for example via reactive extrusion.

Since UV radiation is liable to result in slight yellowing of thermoplastic compositions, UV stabilizers and UV absorbers (these compounds generally being referred to as anti-UV agents) such as benzotriazole, benzophenone and other hindered amines, may be added in certain applications in which such a phenomenon must be avoided. These compounds may be, for example, based on benzophenone or benzotriazole. They may be added in amounts of less than 10% by mass and preferentially from 0.1% to 5% by mass relative to the total mass of the composition.

Antioxidants may also be added to limit the yellowing during the manufacture of the composition, such as phosphorus compounds (phosphonites and/or phosphites) and hindered phenolic compounds. These antioxidants may be added in amounts of less than 10% by mass and preferentially from 0.05% to 5% by mass relative to the total mass of the composition. An antioxidant that is preferred in the context of the present invention may consist, for example, of (1,2dihydro-2,2,4-trimethylquinoline), also known by the abbreviation TMQ.

Similarly, in certain applications, flame retardants may also be added to the composition according to the invention. These agents may be halogenated or non-halogenated. Among the halogenated agents, mention may be made of brominated products. Non-halogenated agents that may also be used include phosphorus-based additives such as ammonium polyphosphate, aluminium phosphinates and phosphonates, melamine cyanurates, pentaerythritol, zeolites, and also mixtures of these agents. The composition may comprise these agents in proportions typically ranging from 3% to 30% relative to the total mass of the composition. Dyes or optical brighteners may also be added.

Pigments, for instance titanium dioxide or zinc oxide, may also be added to the composition in proportions generally ranging from 5% to 10% relative to the total mass of the composition.

Reinforcing fillers such as talc, glass fibres, carbon fibres, montmorillonites, carbon nanotubes or carbon black may also be added to the composition, in proportions generally ranging from 2.5% to 30% and more preferentially up to 10%, relative to the total mass of the composition.

Materials Used For Making the Test Formulations:

TBEC means O,O-tert-butyl O-2-ethylhexyl monoperoxycarbonate. As presented previously, it is provided in the examples illustrating the present application by Luperox® TBEC manufactured and sold by the Applicant.

TBIC means O,O-tert-butyl O-isopropyl monoperoxycarbonate. As presented previously, it is provided in the examples illustrating the present application by Luperox® TBIC M75, i.e. TBIC is present to 75% in an isododecane solution. In the various figures, taken from some of the tests performed by the Applicant, TBIC especially is noted with a variable dilution index, especially at 40%, 50% or 60%, which corresponds, respectively, to an abbreviation M40, M50 and M60.

P means tert-butyl peroxybenzoate (peroxide) and is conventionally sold in pure form. It is sold by the Applicant under the name Luperox® P.

101 means 2,5-dimethyl 2,5-di(tert-butylperoxy)hexane and is conventionally sold in pure or virtually pure form. This peroxide is sold by the Applicant under the name Luperox® 101.

270 means tert-butyl peroxy-3,5,5-trimethylhexanoate and is conventionally sold in pure or virtually pure form. This peroxide is sold by the Applicant under the name Luperox® 270.

531 M80 means 1,1-bis(tert-amylperoxy)cyclohexane diluted to 80% in isododecane, for example. This peroxide is sold by the Applicant under the name Luperox® 531M80.

331 M50 means 1,1-bis(tert-butylperoxy)cyclohexane diluted to 50% in isododecane, for example. This peroxide is sold by the Applicant under the name Luperox® 331M50.

JWEB50 means poly(t-butyl) peroxycarbonate polyether diluted to 50% in ethylbenzene, for example. This peroxide is sold by the Applicant under the name Luperox® JWEB50.

EVA means an ethylene-vinyl acetate copolymer. The same type of EVA is used for all the experiments and tests in order to ensure that the results are not dependent on the type of EVA used. By way of example, as mentioned previously, mention will be made of Evatane® 18-150 sold by the Applicant and which consists of an EVA with 18% vinyl acetate and 150 as melt flow index (MFI) value measured according to standard ASTM 1238 or Evatane® 40-55 sold by the Applicant and which consists of an EVA with 40% vinyl acetate and 55 as melt flow index (MFI) value measured according to standard ASTM 1238.

Tests Performed and Results:

In all the figures, the term "phr" means "per hundred resin". Thus, by way of example, if 1 phr is considered for a given peroxide, this means that, in the composition tested, there is 1 unit (by weight) of this peroxide present per 100 units of the polymer to be crosslinked.

FIG. 1 shows the crosslinking density measurements for an EVA with a peroxide.

TBEC is considered as the reference for a crosslinking at 3.38 dN.m for 1 phr. It is observed that, with respect to this peroxide TBEC conventionally used for crosslinking EVA, the other standard peroxides P, 101, 270, 531M80, 331M50 and JWEB50 must be present in larger or even very (very) much larger amounts to obtain the same level of crosslinking as TBEC.

Only TBIC, to obtain the same level of crosslinking, requires a smaller amount, i.e. in the present case 0.9 phr. Thus, the use of TBIC makes it possible to reduce the costs (due to the smaller amount) and thus the level of volatile organic compounds originating from the decomposition of the peroxide itself in the crosslinked EVA.

Figure 2:
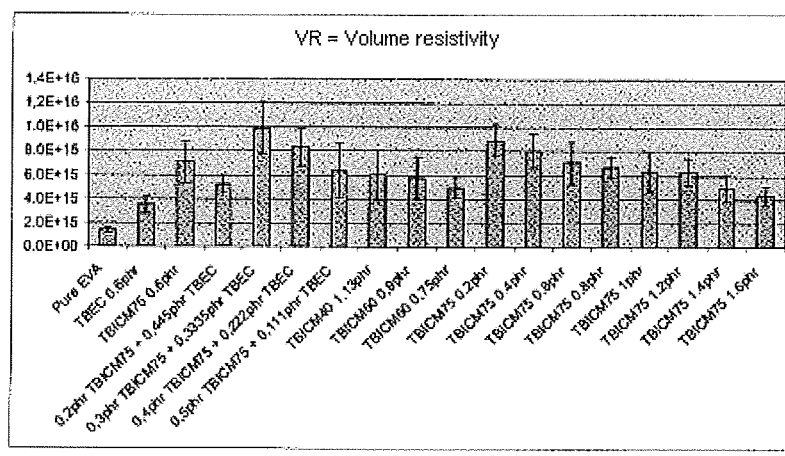
FIG. 2 shows the (electrical) resistivity by volume (VR) for various compositions, from pure EVA (non-crosslinked) up to mixtures of EVA that has been crosslinked with TBEC and TBIC.

FIG. 2 makes it possible to draw two main conclusions. Firstly, the TBIC used in very small amount (0.2 phr) makes it possible to drastically increase the volume resistivity of the crosslinked polymer and that TBIC alone has much better results than TBEC alone. Finally, it will also be noted that a virtually equivalent (50/50) mixture of TBIC and TBEC has a synergistic effect since the results observed on this VR test are the best.

Figure 3:
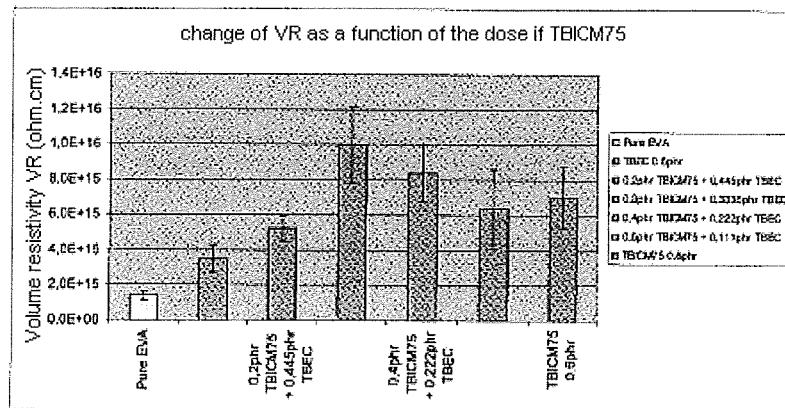
FIG. 3 shows the change in the VR as a function of the dose of TBIC.

FIG. 3 confirms the conclusion that the TBIC+TBEC mixture, in specific respective proportions, has the best results on the VR test.

Figure 4:
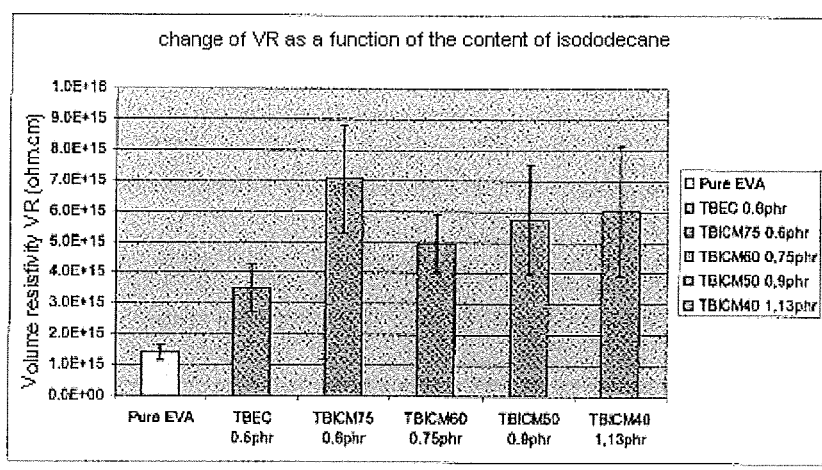
FIG. 4 shows the change in the VR as a function of the content of isododecane (standard hydrocarbon-based solvent for peroxides)

FIG. 4 makes it possible in particular to establish that the diluent or solvent, in the present case isododecane, has no impact on the volume resistivity measurement.

It will be noted here that the solvent used for TBIC is isododecane, but that other organic solvents were tested and that the results are identical or virtually identical to those presented here.

Figure 5:
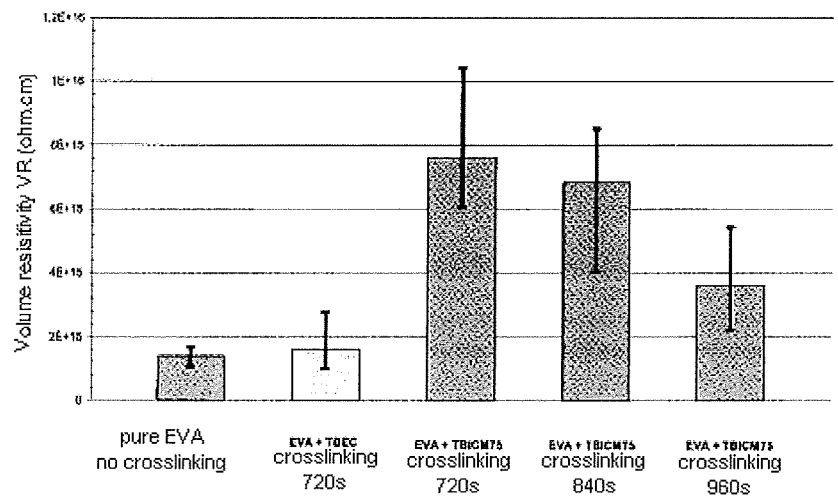
FIG. 5 shows the resistivity by volume of an EVA polymer crosslinked with TBIC as a function of the crosslinking time.

FIG. 5 makes it possible mainly to establish the fact that TBIC achieves rapid crosslinking of the polymer and that the shorter the crosslinking time, the higher the level of volume resistivity, which allows precise metering of the desired level of volume resistivity for the polymer to be crosslinked.

It will be noted here that, although all the tests presented in the context of this patent application were performed with EVA, many other polymers usually crosslinked were tested as a mixture with EVA (in a fraction of the latter that is occasionally low or even very low), or even without EVA (replaced with another polymer), and all have identical or virtually identical results and conclusions (as regards TBIC).

Figure 6:
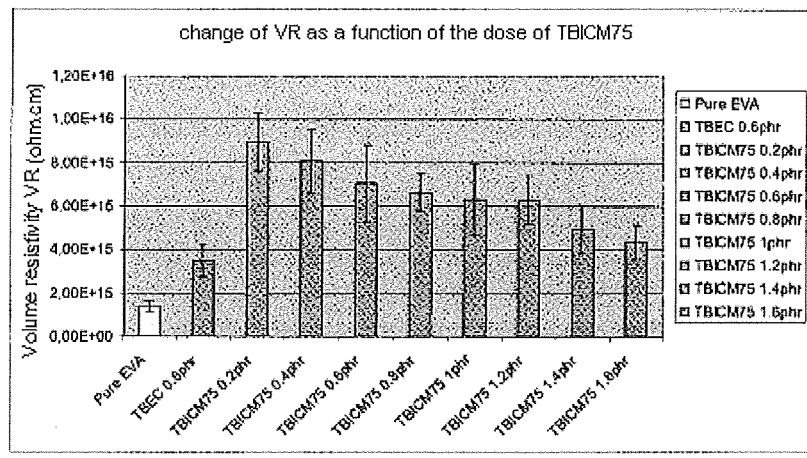
FIG. 6 shows the change in the VR as a function of the dose of TBIC.

FIG. 6 shows again that small amounts of TBIC make it possible to obtain the best results on the VR test.

It is clearly understood here that the amount of TBIC defined as preferred ranges, or even more preferred ranges, is admittedly dependent on this result on the VR test, but also on other parameters such as, in particular, the thermomechanical properties of the crosslinked polymer.

The invention claimed is:

1. A crosslinkable composition comprising at least one ethylene-vinyl acetate (EVA) copolymer and a combination of peroxides, wherein the combination of peroxides comprises:
   (i) O,O-tert-butyl O-isopropyl monoperoxycarbonate or O,O-tert-amyl O-isopropyl monoperoxycarbonate; and
   (ii) O,O-tert-butyl O-2-ethylhexyl monoperoxycarbonate or O,O-tert-amyl O-2-ethylhexyl monoperoxycarbonate,
   in a mass ratio of 40%/60% to 60%/40% of peroxide (i)/peroxide (ii),
   wherein the total amount of peroxide (i) and peroxide (ii) represents between 0.2% and 4% of the mass amount of the polymer present in the composition.

2. The crosslinkable composition according to claim 1, wherein the peroxide consists of a mixture of:
   (a)
      (i) O,O-tert-butyl O-isopropyl monoperoxycarbonate, or
      (ii) O,O-tert-amyl O-isopropyl monoperoxycarbonate; and
   (b)
      (i) O,O-tert-butyl O-2-ethylhexyl monoperoxycarbonate, or
      (ii) O,O-tert-amyl O-2-ethylhexyl monoperoxycarbonate (TAEC).

3. The crosslinkable composition according to claim 2, wherein the mixture represents between 0.5% and 2.5% of the mass amount of the polymer present in the composition.

4. The crosslinkable composition according to claim 1, wherein the ethylene-vinyl acetate (EVA) copolymer is present in the composition in a content ranging from 70% to 99.9% by weight relative to the weight of the composition.

5. The crosslinkable composition according to claim 1, wherein the composition further comprises one or more crosslinking coagents or promoters.

6. The crosslinkable composition according to claim 1, wherein a functional agent is present in the composition in a content ranging from 0.05% to 30% by weight relative to the weight of the composition.

7. A process for manufacturing a film of crosslinked polymer, wherein it comprises at least the following steps:
   (a) extrusion in the form of a film of a crosslinkable composition according to claim 1, and
   (b) crosslinking of the crosslinkable composition after the extrusion step (a) for a time of not more than twenty minutes.

8. The crosslinkable composition according to claim 1, wherein the mass ratio is 45%/55% to 55%/45% of these peroxide (i)/peroxide (ii).

9. The crosslinkable composition according to claim 1, wherein the peroxide comprises O,O-tert-butyl O-isopropyl monoperoxycarbonate and O,O-tert-butyl O-2-ethylhexyl monoperoxycarbonate.

10. The crosslinkable composition according to claim 1, wherein the peroxide comprises O,O-tert-butyl O-isopropyl monoperoxycarbonate and O,O-tert-amyl O-2-ethylhexyl monoperoxycarbonate.

11. The crosslinkable composition according to claim 1, wherein the peroxide comprises O,O-tert-amyl O-isopropyl monoperoxycarbonate and O,O-tert-butyl O-2-ethylhexyl monoperoxycarbonate.

12. The crosslinkable composition according to claim 1, wherein the peroxide comprises O,O-tert-amyl O-isopropyl monoperoxycarbonate and O,O-tert-amyl O-2-ethylhexyl monoperoxycarbonate.

13. The crosslinkable composition according to claim 1, wherein the peroxide consists of O,O-tert-butyl O-isopropyl monoperoxycarbonate and O,O-tert-butyl O-2-ethylhexyl monoperoxycarbonate.

14. The crosslinkable composition according to claim 1, wherein the peroxide consists of O,O-tert-butyl O-isopropyl monoperoxycarbonate and O,O-tert-amyl O-2-ethylhexyl monoperoxycarbonate.

15. The crosslinkable composition according to claim 1, wherein the peroxide consists of O,O-tert-amyl O-isopropyl monoperoxycarbonate and O,O-tert-butyl O-2-ethylhexyl monoperoxycarbonate.

16. The crosslinkable composition according to claim 1, wherein the peroxide consists of O,O-tert-amyl O-isopropyl monoperoxycarbonate and O,O-tert-amyl O-2-ethylhexyl monoperoxycarbonate.

17. The crosslinkable composition according to claim 1, wherein, after crosslinking, the composition possesses an electrical resistivity by volume of 8.0E+15 ohm·cm to 1.0E+16 ohm·cm.

18. A crosslinkable composition comprising at least one ethylene-vinyl acetate (EVA) copolymer and at least one peroxide, wherein the peroxide comprises:
   (i) O,O-tert-butyl O-isopropyl monoperoxycarbonate or O,O-tert-amyl O-isopropyl monoperoxycarbonate; and (ii) O,O-tert-butyl O-2-ethylhexyl monoperoxycarbonate or O,O-tert-amyl O-2-ethylhexyl monoperoxycarbonate, in a mass ratio of 40%/60% to 60%/40% of peroxide (i)/peroxide (ii), wherein, after crosslinking, the composition possesses an electrical resistivity by volume of 8.0E+15 ohm·cm to 1.0E+16 ohm·cm, and wherein the total amount of peroxide (i) and peroxide (ii) represents between 0.2% and 4% of the mass amount of the polymer present in the composition.

* * * * *